United States Patent [19]
Kalenowsky

[11] Patent Number: 5,063,340
[45] Date of Patent: Nov. 5, 1991

[54] CAPACITIVE POWER SUPPLY HAVING CHARGE EQUALIZATION CIRCUIT

[75] Inventor: John A. Kalenowsky, Palatine, Ill.

[73] Assignee: Motorola, Inc., Schaumburg, Ill.

[21] Appl. No.: 603,087

[22] Filed: Oct. 25, 1990

[51] Int. Cl.[5] .............................................. H02H 7/16
[52] U.S. Cl. ........................................ 320/1; 361/16; 361/17; 320/18
[58] Field of Search .............................. 320/1, 15–18; 361/15–18; 315/241 R, 241 P

[56] References Cited

U.S. PATENT DOCUMENTS

| | | | |
|---|---|---|---|
| 3,041,501 | 6/1962 | Willits | 361/16 |
| 3,237,078 | 2/1966 | Mallory | 320/17 |
| 3,393,355 | 7/1968 | Whoriskey et al. | 320/18 |
| 3,456,129 | 7/1969 | Burnett et al. | 315/241 R |
| 3,652,914 | 3/1972 | Krausser | 320/1 |
| 4,040,000 | 8/1977 | Dwivedi | 315/241 R |
| 4,434,395 | 2/1984 | Higuchi | 320/1 |
| 4,672,289 | 6/1987 | Ghosh et al. | 320/1 |
| 4,687,971 | 8/1987 | Shimizu | 315/241 R |
| 4,713,597 | 12/1987 | Altmejd | 320/13 |
| 4,975,796 | 12/1990 | MacDougall | 361/16 |
| 4,999,761 | 3/1991 | Bingham et al. | 320/1 |
| 5,010,279 | 4/1991 | Latham et al. | 315/241 R |

FOREIGN PATENT DOCUMENTS

| | | | |
|---|---|---|---|
| 1762589 | 10/1970 | Fed. Rep. of Germany | 320/1 |
| 4534658 | 5/1966 | Japan | 320/1 |
| 0170382 | 10/1983 | Japan | 320/1 |
| 0712877 | 1/1980 | U.S.S.R. | 320/18 |
| 1495898 | 7/1989 | U.S.S.R. | 361/15 |

Primary Examiner—Steven L. Stephan
Assistant Examiner—Thomas M. Dougherty
Attorney, Agent, or Firm—Robert H. Kelly

[57] ABSTRACT

A capacitive power supply having a charge equalization circuit. The charge equalization circuit is comprised of a shunt circuit connected in a parallel connection with capacitive elements of the capacitive power supply. Once a charging current is applied to the capacitive power supply to store charge thereupon to form thereby a potential difference across the capacitive elements of a pre-determined level, the shunt circuit forms a shunt to shunt the charging current thereto.

26 Claims, 7 Drawing Sheets

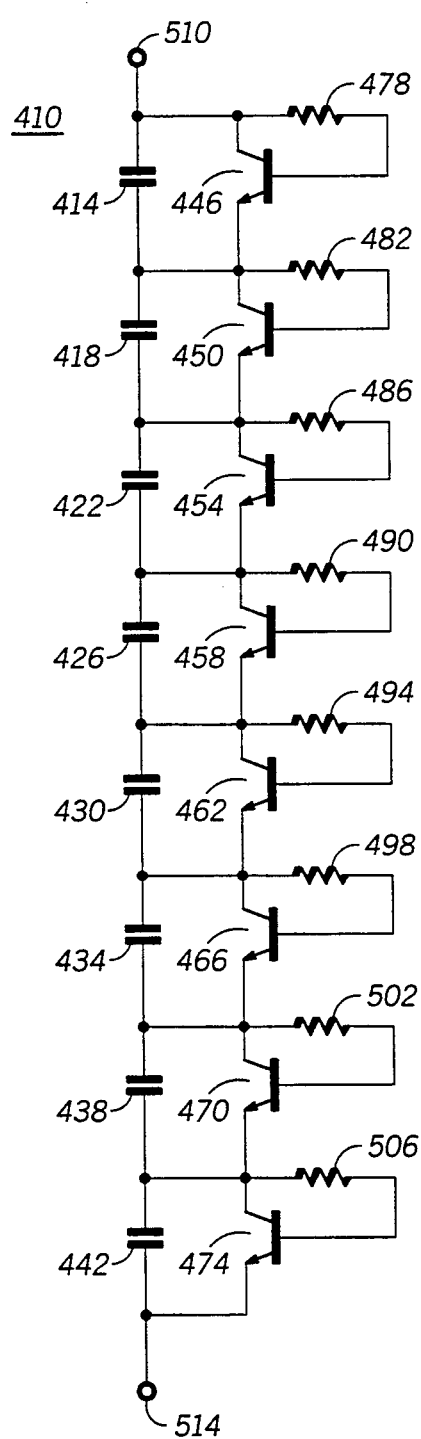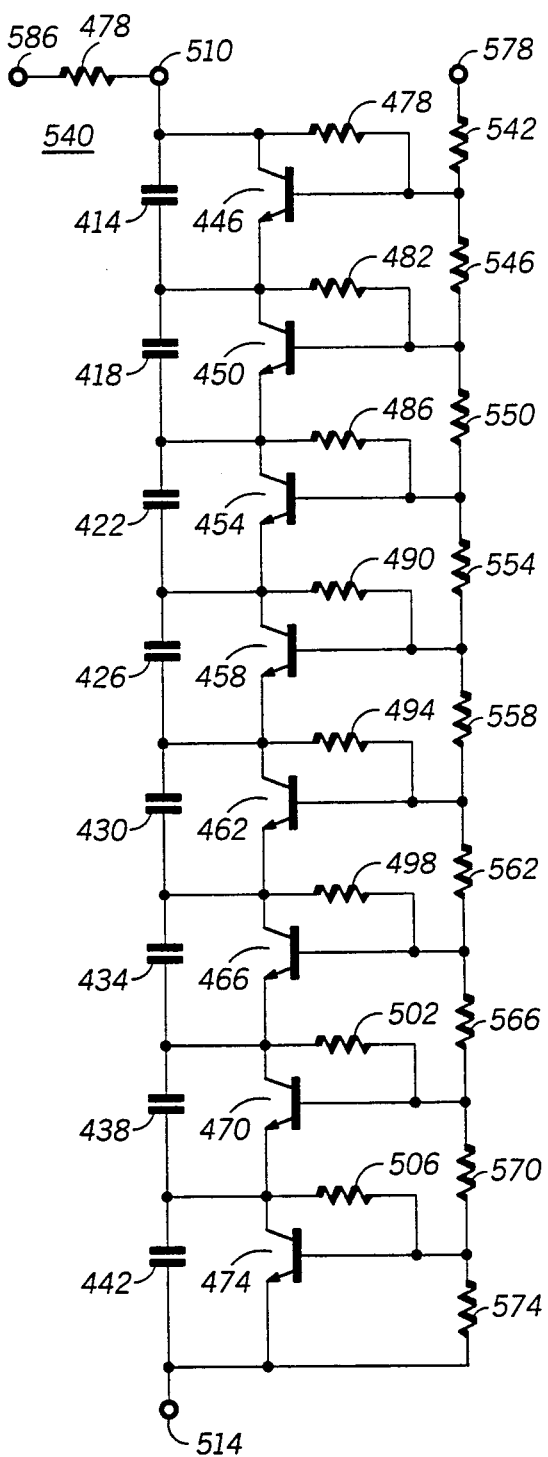
*FIG.10*   *FIG.11*

CAPACITIVE POWER SUPPLY HAVING CHARGE EQUALIZATION CIRCUIT

BACKGROUND OF THE INVENTION

The present invention relates generally to capacitive power supplies, and, more particularly to a capacitive power supply having a charge equalization circuit which ensures that the electrical charge collected and stored by the capacitive power supply does not exceed a pre-determined leve.

In order to permit operation of an electrical device at a location not proximate to a permanent power source, a portable power supply is positioned proximate to the electrical device. Once the portable power supply and the electrical device are suitably connected theretogether, the portable power supply may be utilized to power the electrical device thereby. Conventionally, a portable power supply is formed of an electrochemical material, and energy is stored by the electrochemical material in the form of chemical energy. Power required to operate the electrical device is formed by converting the stored, chemical energy of the electrochemical material into electrical energy.

Such a conventional, electrochemical power supply is commonly referred to as a battery, and one or more commercially-available batteries may be utilized to generate a direct current voltage to power many varied types, constructions, and designs of electrical devices. Such conventional, electrochemical battery power supplies are widely available, and, therefore, are conveniently utilized to form the portable power supply to power an electrical device thereby.

A conventional, electrochemical battery is, however, of a finite energy storage capacity. Therefore, a single battery (or several batteries connected theretogether) may be utilized to power an electrical device for only a limited period of time. As the stored, chemical energy of the electrochemical material is converted into electrical energy to power the electrical device, the battery becomes discharged as the stored chemical energy contained by the electrochemical material becomes dissipated.

Once the remaining, stored energy of the battery is depleted below a certain level, replacement of the battery is necessitated to permit continued operation of the electrical device. The frequency with which the battery must be replaced, is, of course, dependent upon the battery capacity (i.e., the amount of energy stored in the battery), the energy required to operate the electrical device, and the frequency with which the electrical device is operated. Other types of portable power supplies are similarly of a finite energy storage capacity, and, therefore, similarly become depleted of stored energy after a period of use thereof.

A battery-type construction comprised of a nickel-cadmium (Ni-Cd) material is often utilized to power an electrical device. The use of the nickel-cadmium material to form the electrochemical material is advantageous for the reason that, once a battery formed therefrom is depleted of stored energy, an electrical, charging current may be applied to the battery to recharge the battery thereby. Battery-type constructions comprised of other materials may similarly be recharged once depleted of stored energy by the application of a charging current thereto.

Battery-type constructions comprised of a nickel-cadmium material (as well as other such similar materials) are not of unlimited battery-lifes. That is to say, a rechargeable battery comprised of such a material cannot be recharged and reused an unlimited number of times. Over time, as the nickel-cadmium battery is discharged, and subsequently recharged, the efficiency of energy conversion of electrical energy (supplied by the charging current to recharge the battery) into stored chemical energy of the electrochemical material is reduced. Over time, such reduction in efficiency of energy conversion makes impractical continued reuse of the same battery. Once the battery may no longer be efficiently recharged, the battery must be discarded and replaced with a battery capable of being efficiently recharged to permit continued powering of the electrical device.

Additionally, when recharging a rechargeable battery, the rate at which the charging current is applied to the battery must be controlled. If the charging current applied to the battery to recharge the battery thereby is beyond a certain level, the battery may be damaged by the charging current. The maximum, allowable level of charging current which may be applied to various battery-type constructions to recharge the battery thereby varies. For instance, a rechargeable battery comprised of the aforementioned nickel-cadmium material may be recharged with a charging current of 600 millamperes. A battery-type construction comprised of a lithium material (another material of which a rechargeable battery may be comprised), conversely, cannot be charged with a charging current in excess of 100 milliamperes. Battery charging apparatus utilized to provide the rechargeable battery with the charging current to charge to the battery thereby cannot be utilized to recharge rechargeable batteries of the various battery-type constructions without appropriate alteration of the level of the charging current.

Further, because the level of the charging current applied to the rechargeable battery cannot exceed a certain, maximum level, the charging rate of the battery cannot be increased beyond the allowable level, and the time required to recharge a battery, once discharged to a certain level, cannot be reduced below a certain minimum time period. If only one rechargeable battery is available to power the electrical device, the electrical device cannot be operated once the battery has been discharged beneath a minimum level, and the time period required to recharge the battery to a level above the minimum level to permit continued operation of the load element, cannot be reduced less than the minimum time period.

Still further, when charging a rechargeable battery, such as a nickel-cadmium battery, with a maximum, allowable charging current, once the battery becomes fully charged, application of the charging current at the high charging level to the battery must be terminated. Continued charging of the battery at the high charging rate can cause gassing, electrolytic venting of the battery, permanent loss of battery capacity, and physical damage to the battery.

Other constructions of portable power sources are known, but heretofore have been practical for only low power applications. In particular, capacitive power sources have been utilized as back-up power supplies for integrated circuit memories to power the integrated circuits for short periods of time, such as may occur during temporary power interruptions.

Capacitors having capacitances of values great enough to generate current levels to power most electrical devices (e.g., a consumer electronic device such as a portable radiotelephone) for extended periods of time have previously been impractical for the reason that the capacitors forming such capacitive power supplies would be of prohibitively large dimensions. Other of such capacitive power sources are of very high effective resistances, and are similarly impractical for use to generate large current levels. However, co-pending application Ser. No. 596,253, filed on Oct. 12, 1990, and entitled "Capacitive Power Supply" by Metroka et al. discloses a capacitive power supply capable of generating significant current levels for an extended period of time.

The capacitive power supply disclosed therein is capable of generating a continuous current level in excess of 600 milliamperes for a time period in excess of one and one half hours. Once the charge stored by the capacitive power supply has been depleted through discharge of the stored energy of the supply, the capacitive power supply may be quickly recharged by application of a charging current thereto.

When several of the capacitive elements forming the capacitive power supply are connected in series, any variance in the capacitive values of the capacitive elements results in unequal amounts of charge being stored by various ones of the capacitive elements when a charging current is applied thereto. Termination of application of the charging current once a first of the capacitive elements becomes fully charged prevents all of the capacitive elements from being fully charged. Conversely, continued application of the charging current to the circuit after the first of the capacitive elements has been fully charged is inefficient, and could result in arcing of charge across plates of the capacitive elements, or even permanent damage to the capacitive elements.

What is needed, therefore, is a capacitive power supply which may be efficiently charged to a pre-determined level.

SUMMARY OF THE INVENTION

It is, accordingly, an object of the present invention to provide a capacitive power supply capable of generating a potential difference of a precise, known value.

It is a further object of the present invention to provide a charge equalization circuit for a capacitive power supply.

It is a yet a further object of the present invention to provide a capacitive power supply for powering a portable transceiver, such as a radiotelephone.

It is a still a further object of the present invention to provide a radiotelephone construction powered by a capacitive power supply.

In accordance with the present invention, therefore, a portable, rechargeable power supply forming a power source of pre-defined characteristics for powering a load element when coupled thereto is disclosed. The power supply has a first conductive surface comprised of a conductive material for collecting and storing electrical charge responsive to application of a charging current thereto. A second conductive surface is comprised of a conductive material, and is spaced-apart from the first conductive surface whereby a potential difference is formed between the first conductive surface and the second conductive surface when electrical charge is stored upon the first conductive surface. The first conductive surface and the second conductive surface are together of a low electrical resistance to minimize, thereby, resistive loss across the first and second conductive surfaces during discharge of the electrical charge stored upon the first conductive surface to power the load element when coupled thereto. A transistor network formed of at least one transistor has a first terminal thereof connected to the first conductive surface and a second terminal connected to the second conductive surface. The transistor is biased to vary the conductive characteristics thereof such that the transistor forms a shunt when the potential difference formed between the first and second conductive surfaces is beyond a pre-determined value.

BRIEF DESCRIPTION OF THE DRAWINGS

The present invention wil be better understood when read in light of accompanying drawings in which:

FIG. 10 is a circuit schematic of a circuit similar to that of FIG. 9, but wherein a plurality of capacitor-shunt circuit pairs are stacked theretogether in a series connection;

FIG. 11 is a circuit schematic of an alternate embodiment of the rechargeable power supply FIG. 10;

DESCRIPTION OF A PREFERRED EMBODIMENT

Figure 1:
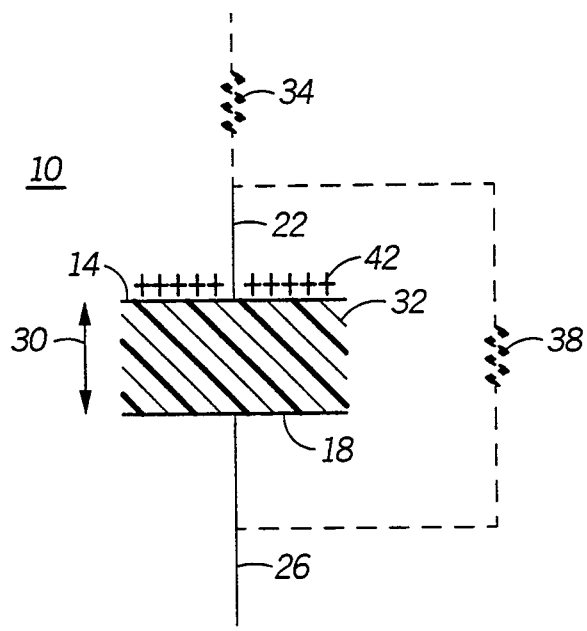
FIG. 1 is a circuit schematic of an actual capacitive element having intrinsic series and parallel resistances associated therewith.

Referring first to the circuit schematic of FIG. 1, a capacitive element, referred to generally by reference numeral 10 is shown. Capacitive element 10 is comprised of first plate member 14 comprised of a conductive material having a surface formed thereupon. Spaced-apart from plate member 14 is plate member 18 which is similarly comprised of a conductive material having a surface formed thereupon. Lead 22 is electrically coupled to plate member 14; similarly, lead 26 is electrically coupled to plate member 18. Preferably, leads 22 and 26 are integrally formed with their respective plate members 14 and 18 and are comprised of the same materials as those of plate members 14 and 18, respectively.

Plate member 18 is spaced-apart from plate member 14 by a length indicated by arrow 30. A gaseous material, such as air, having a constant dielectrical value may be positioned in the gap separating plate members 14 and 18. Alternatively, and as illustrated, other materials, indicated by material 32, having other dielectrical values may be positioned between the gaps separating the plate members 14 and 18.

Further illustrated in FIG. 1, in hatch, are resistors 34 and 38. Resistor 34 is representative of an effective series resistance intrinsically associated with an actual capacitive element. Resistor 38 is representative of the shunt resistance between the spaced-apart surfaces formed upon plate members 14 and 18. The resistive value of resistor 38 is also indicative of leakage between the surfaces formed upon the opposing plate members. Because the shunt resistance, here represented by resistor 38, is typically of a very large value, resistor 38, for practical purposes, forms an open circuit, and need not be considered further. However, the effective series resistance, here represented by resistor 34, although of a low value, may be of significance, especially when several capacitive elements 10 are connected in a series connection. When connected in such a parallel connection, the effective series resistance of each of the capacitive elements may be summed, and the magnitude of the equivalent resistance formed therefrom is a multiple (if the series resistances of each of the capacitive elements are of equal values) of the effective series resistances of each of the capacitive elements 10.

Connection of a charging current source across opposing plate members 14 and 18 of capacitive element 10, such as, for example, by connection of opposite sides of the charging current source to leads 22 and 26, causes electrical charge to be formed upon one of the plates. Positive charge indicators 42, illustrated in FIG. 1 proximate to plate 14, are indicative of such electrical charge formed upon plate member 14. To form a positive charge upon the surface of plate member 14, a positive side of the charging current source is connected to plate member 14, and a negative side of the charging current source is coupled to plate 18. The electrical charge formed upon one of the plate members remains even after the charging current source is disconnected from the plate members 14 and 18. Electrical charge formed, and thereafter stored, upon one of the plate members of the capacitive element 10 causes capacitive element 10 to function as a charge (i.e., energy) storage device. The potential difference formed across the spaced-apart plate members 14 and 18 permits the capacitive element 10 to function as a power supply to power a load element when the opposing plate members of the capacitive element 10 are suitable coupled across a load element.

It is to be noted that capacitors of other designs may be constructed to have spaced-apart surfaces formed upon structures other than plate members, but which similarly function as charge storage devices.

Figure 14:
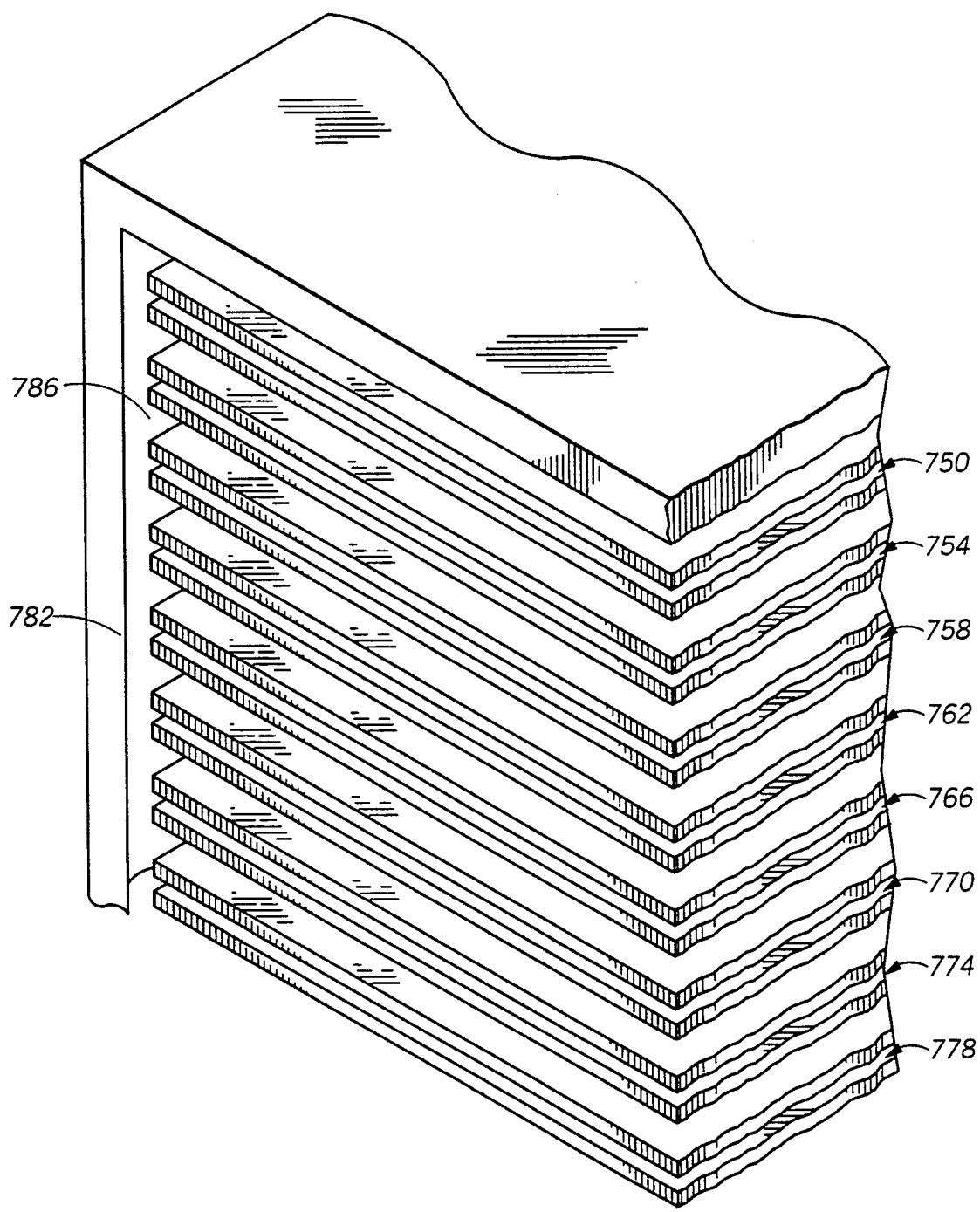
FIG. 14 is a cut-away, schematic view of a portion of the capacitive power supply of the present invention.

Previously, capacitor constructions which were of large capacitive values were of significant physical size. Capacitor designs are now known, however, which are of both high capacitive values and also of small physical dimensions. For example, the capacitive power supply disclosed in the aforementioned co-pending application Ser. No. 596,253 filed on Oct. 12, 1990, is comprised of capacitive elements having spaced-apart plates, each of which are of areas of approximately 40 square centimeters and 5 mils in depth, and which are of capacitances of approximately 6000 farads and capable of forming a potential difference between opposing plate members of 1.2 volts. The plates of the capacitor are comprised of a conductive, ceramic material, and the opposing plates are separated by an aqueous dielectric of a desired dielectric value. Such a capacitor is illustrated in FIG. 14, to be described in greater detail hereinbelow. Capacitors having similar properties may also be constructed wherein the dielectric material is comprised of a nonaqueous material or a solid-state material.

Similar capacitor designs have been disclosed, for example, in articles entitled, "Improved Pulse Power Sources with High-Energy Density Capacitor" by H. Lee, G. L. Bullard, G. C. Mason, and K. Kern in the IEEE Transactions on Magnetics, V. 25, N. 1, January 1981, pages 324–330, and "Operating Principles of the Ultracapacitor" by G. R. Bullard, H. B. Sierra-Alcazar, H. K. Lee, and J. J. Morris in the IEEE Transaction on Magnetics, V. 25, N. 1, January 1989, pages 102–106.

Figure 2:
FIG. 2 is a circuit schematic of plurality of ideal capacitive elements connected in a series connection therebetween.

FIG. 2 is a circuit schematic of a plurality of capacitive elements, here capacitive elements 46, 54, 58, 62, 66, 70, and 74, connected in a series connection therebetween. Capacitive elements 46–74, when constructed as mentioned hereinabove, are capable of storing electrical charge in amounts great enough to generate currents and voltages of levels suitable to power many consumer electronic devices, such as a transceiver utilized in a cellular, communication system.

When a charging current source is coupled to opposing nodes 78 and 82 at opposite sides of the series connection of capacitive elements 46–74, electrical charge is stored upon one plate of each of the capacitors 46–74. A potential difference is thereby formed across the opposing plates of each of the capacitive elements 46–74. The potential difference formed between nodes 78 and 82 is merely the summation of the potential differences formed across each of the capacitive elements 46–74.

Figure 3:
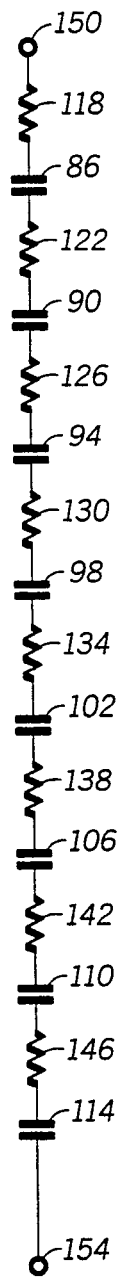
FIG. 3 is a circuit schematic, similar to that of FIG. 2, but illustrating a plurality of actual capacitive elements having effective series resistances associated therewith and connected in a series connection therebetween.

FIG. 3, similar to the circuit schematic of FIG. 2, illustrates eight capacitive elements, here capacitive elements 86, 90, 94, 98, 102, 106, 110 and 114, connected in the series connection therebetween. The circuit schematic of FIG. 3 further illustrates resistors 118, 122, 126, 130, 134, 138, 142 and 146. Resistors 118–146 are representative of the effective series resistances associated with each one of the capacitive elements 86–114. The potential difference formed between nodes 150 and 154 responsive to application of a charging current to the series-connected circuit is actually, therefore, the summation of the potential differences formed across the opposing plates of each of the capacitive elements 86–114 less the voltage drop across each of the resistors 118–146. As also mentioned hereinabove, previously-existing capacitor constructions were also of high effective series resistances which limited, thereby, the potential differences which could be generated therefrom even when a plurality of capacitive elements were stacked theretogether (i.e., connected in a series connection therebetween).

While capacitors have now been developed which are of small sizes, large capacitive values, and small effective series resistances, stacking of pluralities of such capacitors in series connections therebetween can pose problems resulting from variances of actual capacitive values of the individual capacitive elements, such as capacitive elements 86-114.

In particular, because the capacitive elements 86-114 are connected in a series connection therebetween, application of a charging current to opposite sides of the circuit (such as at nodes 150 and 154 of the circuit of FIG. 3), the current applied to each of the capacitive elements 86-114 must be of identical values. Variance in the actual capacitive values of individual ones of the capacitors 86-114, however, causes electrical charge to be formed upon plates of the capacitors 86-114 at different rates. As a result, the potential differences formed across the plates of individual ones of the capacitors 86-114 varies. Such variance in the capacitive values of individual ones of the capacitive elements can result in some of the capacitive elements becoming fully charged prior to full charging of other ones of the capacitive elements. Termination of fast charging once only certain ones of the capacitive elements 86-114 have been fully charged prevents the maximum possible potential difference between nodes 150 and 154 from being obtained. Conversely, continued application of the charging current to the circuit after selected ones of the capacitive elements have been fully charged, is inefficient, or could cause arcing of charge across the spaced-apart plates of fully charged capacitive elements.

It would therefore be beneficial to provide circuitry for equalizing the charge applied to individual ones of the capacitive elements.

Figure 4:
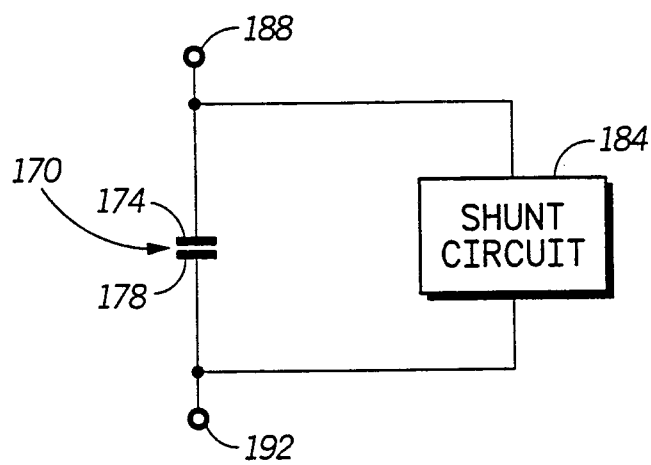
FIG. 4 is a partial circuit schematic, partial block diagram of the rechargeable power supply of the present invention.

The partial circuit schematic, partial block diagram of FIG. 4 illustrates a capacitor 170 having spaced-apart plate members 174 and 178 connected in parallel connection with shunt circuit 184. Capacitor 170 may, for example, be representative of an equivalent capacitance of a plurality of capacitive elements connected theretogether in some combination.

Shunt circuit 184 is operative to form a shunt (i.e., a closed-circuit) for diverting current generated by a charging current source (not shown) applied to nodes 188 and 192. Shunt circuit 184 forms the shunt to shunt current applied to nodes 188 and 192 thereto only when the potential difference taken across plates 174 and 178 of capacitor 170 is beyond a pre-determined value. When the potential difference across plates 174 and 178 of capacitor 170 is less than the pre-determined value, shunt circuit 184 is nonoperative, or shunts negligible amounts of current thereto. Suitable selection of the pre-determined value of potential difference across plates 174 and 178 at which shunt circuit 184 forms a shunt can control the amount of charge stored by capacitor 170. That is, once the electrical charge stored upon a plate (such as, for example, plate member 174) responsive to application of a charging current thereto, reaches a level to cause a potential difference across plates 174 and 178 to equal the pre-determined value, shunt circuit 184 becomes operative to form a shunt which thereby prevents additional charge from being applied and stored upon a plate of the capacitor 170.

Figure 5:
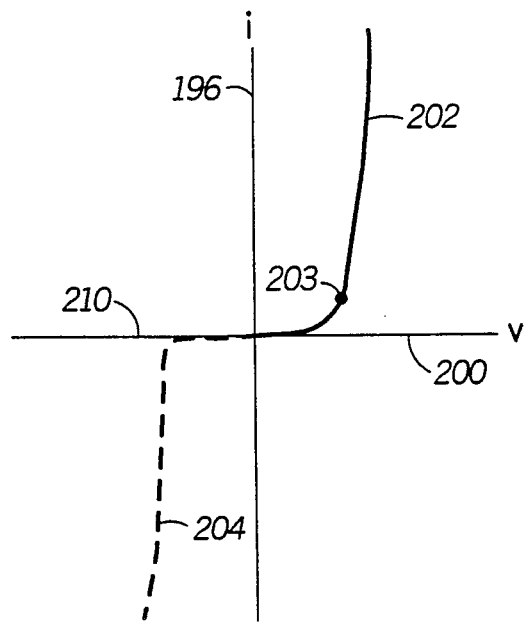
FIG. 5 is a graphical representation of the characteristic curve of a conventional diode.

FIG. 5 is a graphical representation of the characteristic curve, referred to by reference numeral 202, of a typical diode wherein current, measured in amperes, on ordinate axis 196 is plotted as a function of voltage, measured in terms of volts, on abscissa axis 200. At low potential differences between a diode cathode and anode terminals, the diode is highly resistive, and negligible currents are formed. At higher diode anode-to-cathode voltages, the resistive characteristics of the diode are much reduced, and the diode essentially forms a closed circuit. A point on the curve, such as, for example, point 203, is identified as the diode "turn-on" level. Curve portion 204, shown in hatch, of curve 202 is representative of the characteristic curve of a zener diode. As illustrated by curve portion 204, at a certain negative, diode anode-to-cathode voltage, referred to as the breakdown voltage, the diode becomes, essentially, a closed circuit. At positive, diode cathode-to-anode voltages, a zener diode exhibits characteristics similar to other, conventional diode constructions. For example, a conventional, silicon rectifier diode typically has a diode "turn-on" level of between 0.7 volts and 1.5 volts. One such silicon rectifier diode is Motorola diode, part number 1N5400 having a "turn-on" level of 0.75 volts. A schottky diode typically has a diode "turn-on" level of between 0.1 volts and 0.7 volts. One such schottky diode is Motorola diode, part number 1N5820 having a "turn-on" level of 0.2 volts. A zener diode typically has a breakdown voltage of between $-1.8$ volts and $-200$ volts. One such zener diode is Motorola diode, part number 1N5333A and has a breakdown voltage of $-3.3$ volts.

Figure 6A:
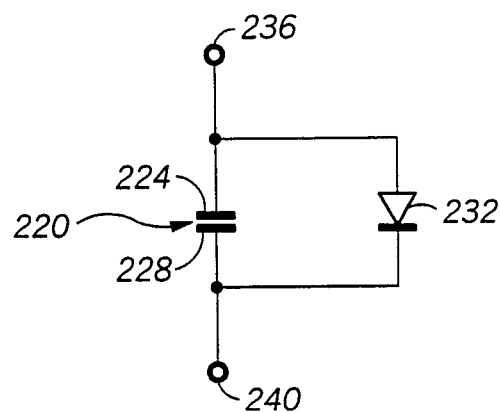
FIGS. 6A and 6B are circuit schematics similar to that of FIG. 4, but illustrating first and second circuit implementations of the shunt circuit of the rechargeable power supply of the present invention.

FIG. 6A is a circuit schematic, similar to that of FIG. 4, wherein a capacitor, here referred to by reference numeral 220 and having plates 224 and 228 at spaced distances thereapart is shown. Connected in parallel connection with plates 224 and 228 of capacitor 220 is diode 232. The anode of diode 232 is coupled to plate member 224 at node 236, and the cathode of diode 232 is coupled to plate member 228 of capacitor 220 at node 240. Connected as illustrated, the characteristics of diode 232 are dependent upon the potential difference across plates 224 and 228 of capacitor 220.

As illustrated in the graphical representation of FIG. 5, as the potential difference across plates 224 and 228 increases responsive to application of the charging current to nodes 236 and 240, the resistive characteristics of diode 232 decreases, and diode 232 increasingly functions as a shunt to shunt current thereto. By appropriate selection of the characteristics of the diode 232, the amount of charge stored upon plates 224 of capacitor 220 may be controlled. For example, as mentioned hereinabove, a schottky diode is typically constructed such that the diode is considered to be, essentially, a short circuit when the diode cathode to anode voltage is in excess of between 0.1 and 0.7 volts. Therefore, when diode 232 is comprised of a schottky diode, the potential difference across plates 224 and 228 will not exceed between 0.1 and 0.7 volts, as once the potential difference across plates 224 and 228 reaches such a voltage, diode 232 forms a shunt to shunt the charging current thereto. When diode 232 is comprised of the aforementioned Motorola schottky diode, part number 1N5820, diode 232 forms a shunt when the potential difference across plates 224 and 228 reaches 0.2 volts.

Figure 6B:
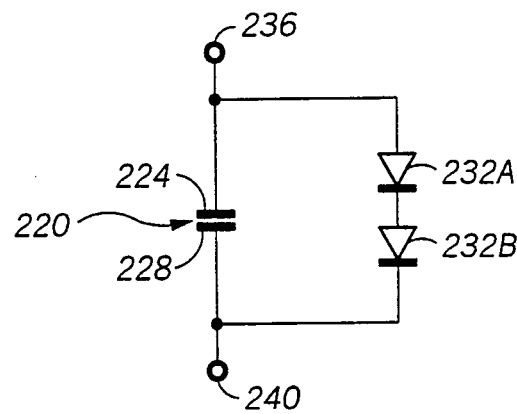

FIG. 6B is a circuit schematic similar to that of FIG. 6A and includes similarly-numbered capacitor 220 having spaced-apart plates 224 and 228 and nodes 236 and 240. Rather than a single diode 232 comprising a shunt circuit, two diodes, here referred to by reference numerals 232A and 232B are connected in a series connection therebetween. The diode pair formed of diodes 232A–B are connected in the parallel connection with plates 224 and 228 of capacitor 220.

By positioning a plurality of diodes, here two, in a series connection, the level of the potential difference across plates 224 and 228 of capacitor 20 level at which the series-connected diode pair 232A–B forms a shunt to shunt current thereto is increased. For instance, when diodes 232A–B are comprised of schottky diodes, the level of potential difference across plates 224 and 228 at which the diode pair 232A–B forms a shunt is increased to between 0.2 volts and 1.4 volts. When two Motorola 1N5820 schottky diodes comprise diodes 232A and 232B, diode pair 232A–B forms a shunt when the voltage across plates 224 and 228 exceeds 0.4 volts. Additional diodes connected in a series connection causes a corresponding increase in the level of the potential difference across plates 224–228 of capacitor 220 at which the diode combination forms a shunt.

Figure 7A:
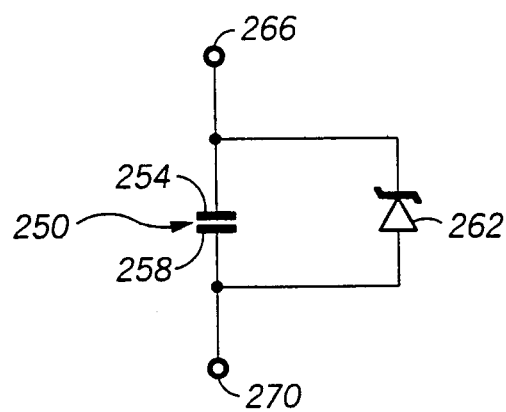
FIGS. 7A and 7B are circuit schematics similar to that of FIG. 4, but illustrating third and fourth circuit implementations of the shunt circuit of the rechargeable power supply of the present invention.

FIG. 7A illustrates a circuit schematic of a capacitor 250 having spaced-apart plates 254 and 258. Connected in a parallel connection with plates 254 and 258 of capacitor 250 is zener diode 262. As illustrated, the cathode of diode 262 is coupled to plate 254 at node 266, and the anode of diode 262 is coupled to plate 258 at node 270. As illustrated by the curve portion 204, shown in hatch, of FIG. 5, when the anode to cathode voltage reaches a negative breakdown voltage, the diode almost immediately exhibits characteristics of a short circuit. Connected as illustrated in FIG. 7A, therefore, when the potential difference across plates 254 and 258 of capacitor 250 reaches the breakdown voltage level, zener diode 262 forms a shunt to shunt current thereto. Additional charge is prevented from being stored upon plate 254 of capacitor 250 once the level of the potential difference between plates 254 and 258 reaches a level equal to the breakdown voltage of zener diode 262. For example, when diode 262 is comprised of the aforementioned Motorola zener diode, part number 1N5333A, diode 262 forms a shunt when the voltage across plates 254 and 258 exceeds (in the negative direction) −3.3 volts.

Figure 7B:
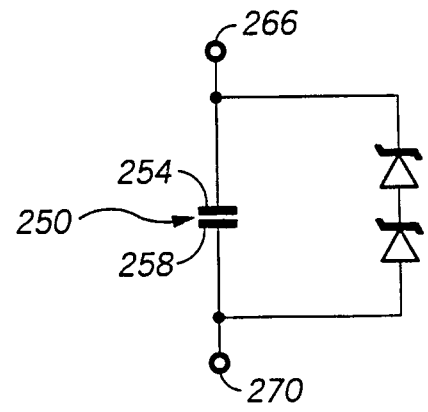

FIG. 7B is a circuit schematic similar to the circuit schematic of FIG. 7A and includes similarly-numbered capacitor 250 having spaced-apart plates 254 and 258 and nodes 266 and 270. Zener diodes 262A and 262B forming a zener diode pair function in a manner similar to diode pair 232A and 232B of FIG. 6B. That is, the level of the potential difference across plates 254–258 of capacitor 250 at which the diode pair 262A and 262B forms a shunt to shunt current thereto is twice the level of the level at which diode 262 of FIG. 7A forms a shunt. In a similar manner, increasing the number of the plurality of zener diodes connected in the series connection therebetween causes a corresponding increase in the level of the potential difference across plates 254 and 258 of capacitor 250 at which the diodes forming the shunt circuit forms a shunt.

It is further noted that, while not illustrated in FIG. 6B or FIG. 7B, combinations of various diode constructions may be connected theretogether to form a shunt circuit of desired characteristics, and, also, tandemly positioned diodes may be connected such that an anode of a first diode may be connected to an anode of an adjacent diode, or, conversely, a cathode of a first diode may be connected to a cathode of a second diode.

Figure 8:
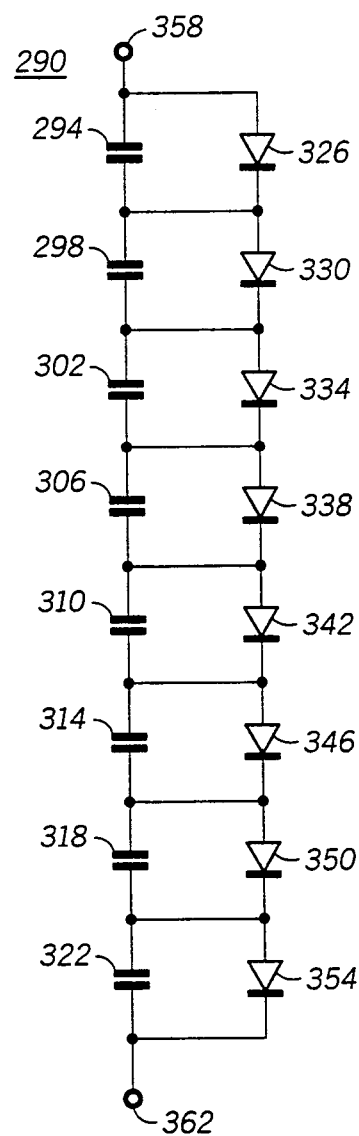
FIG. 8 is a circuit schematic of a circuit similar to that of FIG. 6A, but wherein a plurality of capacitor-shunt circuit pairs are stacked theretogether in a series connection.

FIG. 8 is a circuit schematic of a circuit, referred to generally by reference numeral 290, which is capable of storing pre-determined levels of electrical charge to form a voltage source of a known potential thereby. Circuit 290 is comprised of eight capacitors 294, 298, 302, 306, 310, 314, 318 and 322 connected in a series connection therebetween. Connected in a parallel connection with each capacitor 294–322 are diodes 326, 330, 334, 338, 342, 346, 350 and 354. Each capacitor-diode pair (here capacitor-diode pairs 294–326, 298–330, 302–334, 306–338, 310–342, 314–346, 318–350 and 322–354) is similar in operation to capacitor-diode pair 220–232 of FIG. 6A.

It is noted that, as described previously, the circuits of FIGS. 6B, 7A, and 7B operate in manners similar to the circuit of FIG. 6A. Therefore, the circuits of FIGS. 6B, 7A, and/or 7B may similarly be utilized to form a circuit similar to circuit 290 of FIG. 8.

When connected as shown, variances in capacitive values of capacitors 294–322 of circuit 290 does not result in the storage of unequal of amount of charge (and, hence, unequal formation of potential differences) upon application of a charging current to nodes 358 and 362. Rather, once the charge stored upon a plate of any capacitor 294–322 is great enough to form a potential difference across the opposing plates of the capacitors 294–322 to alter the resistive characteristics of a diode 326–354 associated therewith, the particular diode 326–354 forms a shunt to shunt current thereto, thereby preventing additional charge from being stored by the respective capacitor 294–322. It is the electrical characteristics of the diodes, which may be precisely controlled, which are determinative of the amount of charge stored by each of the capacitors.

In such a manner, each capacitor 294–322 of circuit 290 stores amounts of charge not to exceed a level determined by the charge at which the potential difference across opposing plates of capacitors 294–322 causes corresponding diodes 326–354 to form shunts to shunt current thereto. Once a charging current is no longer applied to nodes 254 and 362 of circuit 290, the charge stored by each capacitor 294–322, and the potential difference across nodes 358 and 362 derived therefrom, may be discharged when circuit 290 is appropriately coupled to a load device to power the load device thereby.

Figure 9:
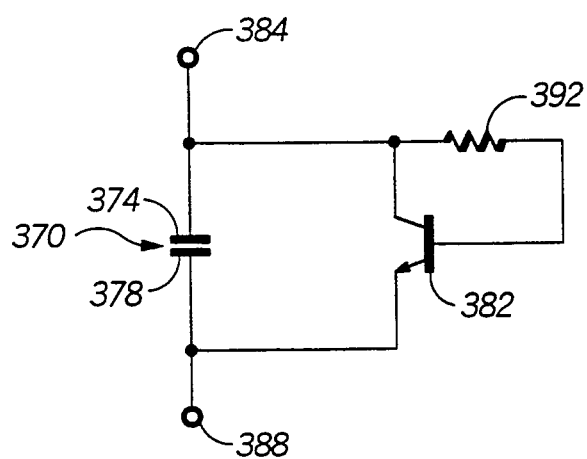
FIG. 9 is a circuit schematic, similar to that of FIG. 4, but illustrating a fifth circuit implementation of the rechargeable power supply of the present invention.

FIG. 9 is a circuit schematic of capacitor 370 having spaced-apart plates 374 and 378 connected in a parallel connection with a transistor network having transistor 382. A collector electrode of transistor 382 is coupled to plate 374 of capacitor 370 at node 384. An emitter electrode of transistor 382 is coupled to plate 378 of capacitor 370 at node 388. A base electrode of transistor 382 is also coupled to plate 374 through resistor 392. At low collector to emitter voltages (i.e., when the potential difference across 374 and 378 is of a low level) transistor 382 forms an open circuit. As the transistor collector to emitter voltage of transistor 382 increases (i.e., as the potential difference across plates 374–378 of capacitor 370 increases), the current at the base electrode increases once the base to emitter voltage exceeds a predetermined value (commonly referred to as the Base-Emitter ON Voltage). The current at the collector electrode is then essentially proportional to the current at the base electrode (namely, the collector current is related to the base electrode by a factor referred to as beta—typically a large value). Transistor 382 thereby increasingly functions as a shunt to shunt current thereto as the collector to emitter voltage increases. At a certain transistor collector to emitter voltage, determined by the potential difference across plates 374 and 378 of capacitor 370, transistor 382 forms a highly conductive path to shunt substantially all of the current applied by a charging current source when connected to nodes 384 and 388.

FIG. 10 is a circuit schematic of a circuit, referred to generally by reference numeral 410, and includes eight capacitors 414, 418, 422, 426, 430, 434, 438 and 442 connected in a series connection therebetween. Circuit 410 of FIG. 10 is similar to circuit 290 of FIG. 8, with the substitution of transistor networks having transistors 446, 450, 454, 458, 462, 466, 470, and 474 for diodes 326-354 of FIG. 8. Each capacitor-transistor pair (here capacitor-transistor pairs 414-446, 418-450, 422-454, 426-458, 430-462, 434-466, 438-470 and 442-474) operate in a manner similar to capacitor-diode combination 370-382 of FIG. 9. Circuit 410 of FIG. 10 further illustrates resistors 478, 482, 486, 490, 494, 498, 502 and 506 connected between the collector and base electrodes of transistors 446-474 which forms a portion of the respective transistor networks. Upon application of a charging current to nodes 510 and 514, each capacitor 414-442 is charged with a charging current of an identical level. Variances in charge storage caused by variances in capacitive values of capacitors 414-442 are compensated for as increasing potential differences taken across plates of capacitors 414-442 cause transistors 446-474 associated therewith increasingly to form shunts to shunt the charging current thereto. Once the charging current source is no longer applied to nodes 510 and 514, the charge applied to capacitors 414-442 is stored thereby. Because the charge stored by each of the capacitors 414-442 is thereby of a precisely-known value, and the potential differences across the plates derived therefrom are also of precisely-known values, the potential differences between nodes 510 and 514 may also be determined.

Turning now to the circuit schematic of FIG. 11, a circuit, referred to generally by reference numeral 540, is shown. Circuit 540 is similar to circuit 410 of FIG. 10 and includes similarly-numbered capacitors 414-442 connected in a series connection therebetween, transistors 446-474, each associated with a capacitor 414-442, respectively, and resistors 478-506 connected between collector and base electrodes of transistors 446-474, respectively. Additionally, transistor biasing circuitry may be added, as desired. Circuit 540 of FIG. 11 further includes resistors 542, 546, 550, 554, 558, 562, 566, 570, and 574 connected in a series connection theretogether wherein nodes formed between adjacent ones of the resistors 542-574 are electrically connected to base electrodes of transistors 446-474. A first side of resistor 542 forms node 578. Resistor 582 is coupled to node 510 at one thereof and forms node 586 at a second side thereof.

Resistors 542-574 form a voltage divider circuit for supplying bias currents in addition to, or to offset, bias currents supplied by the respective resistors 478-506 to respective base electrodes of transistors 446-474. A charging current coupled at a first side thereof to nodes 586 (coupled through resistor 582 to node 510) and 578, and at a second side thereof to node 514 causes biasing voltages to be present at the base electrodes of transistors 446-474 of values corresponding to the resistances of resistors 542-574. These biasing voltages are proportional to the voltage at node 586. The voltage divider circuit comprised of resistors 542-574 forms a biasing circuit.

By selection of large values of resistors 542-574, the biasing current at resistors 542-574 is of a small value relative to the value of the current supplied to capacitors 414-442 to charge the capacitors thereby.

While not shown, diodes may further be connected at the nodes between adjacent ones of the resistors 542-574 and base electrodes of transistors 446-474 to prevent formation of discharge paths (such as e.g., through resistor 478 and then resistors 546-574).

Once the charging current is no longer applied to nodes 510-514, the charge is stored by capacitors 414-442, and the potential differences across the plates of the respective capacitors 414-442 derived therefrom is of known values which, similarly, may be utilized to power a load element.

Figure 12:
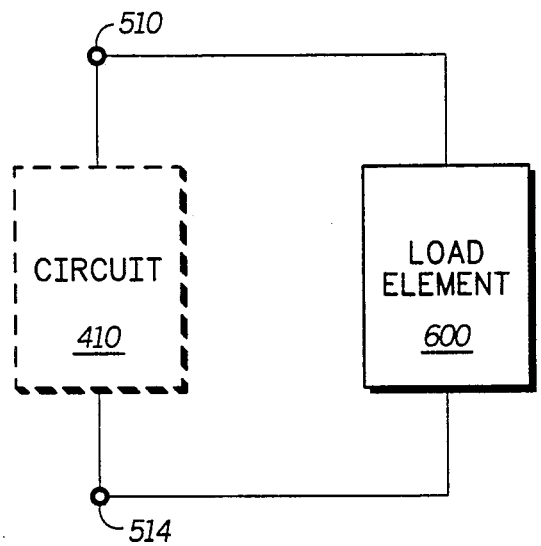
FIG. 12 is a partial circuit schematic, partial block diagram of the rechargeable power supply of the present invention connected to power a load element thereby.

FIG. 12 is a partial circuit schematic, partial block diagram of circuit 410 of FIG. 10 connected at nodes 510 and 514 thereof across load elements 600. As described previously, application of a charging current to circuit 410 stores electrical charge upon plates of each of the capacitors 414-442 of the circuit 410 to generate known potential differences across each of the capacitors 414-442, and, hence, a known potential difference across nodes 510 and 514. When circuit 410 is connected as illustrated in FIG. 12, discharge of the stored charge of the capacitors 414-442 generates a current to power load element 600 thereby. Circuit 410 thereby forms a capacitive power supply capable of generating known levels of currents and voltages. It is to be noted that circuit 290 of FIG. 8, circuit 540 of FIG. 11, and other circuits equivalent thereto, may similarly be utilized to power load device 600 thereby.

Figure 13:
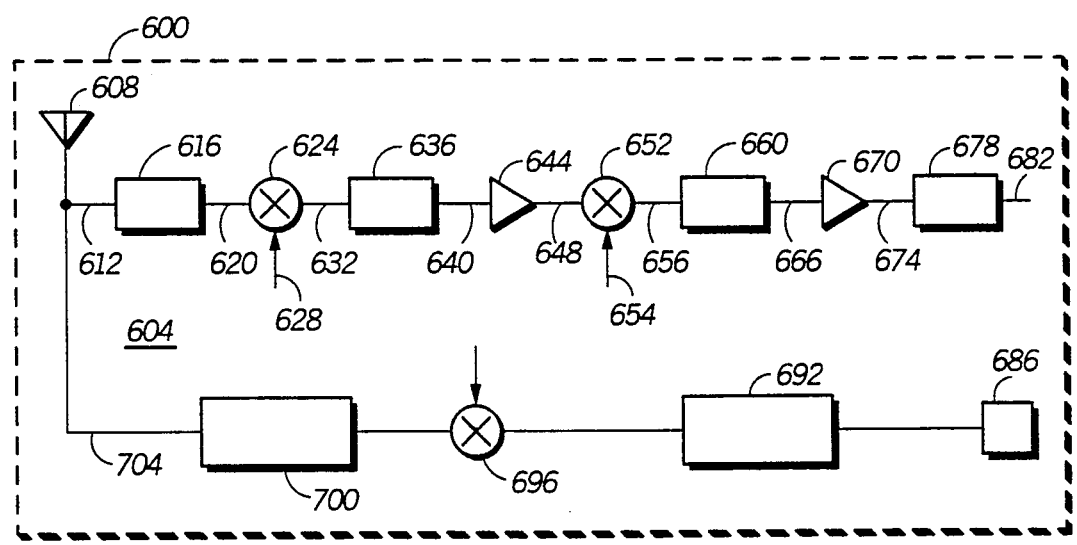
FIG. 13 is a block diagram of a transceiver which may be powered by the capacitive power supply of the present invention.

Turning now to the block diagram of FIG. 13, a radiotelephone, referred to generally by reference numeral 604, constructed according to the teachings of the present invention, is illustrated. Radiotelephone 604 is enclosed by block 600, shown in hatch, which corresponds to load element 600 of FIG. 12. Suitable connection of radiotelephone 604 to nodes 512 and 514 of circuit 410 (or, for example, to nodes 358 and 362 of circuit 290 of FIG. 8 or to nodes 510 and 514 of circuit 540 of FIG. 11) permits powering of the radiotelephone 604 thereby. The actual circuitry embodying the functional blocks of radiotelephones 604 may be disposed upon one or more circuit boards and housed within a conventional radiotelephone housing. A transmitted signal transmitted, by, for example, a base station of a cellular, communication system, transmits a signal to antenna 608. Antenna 608 supplies the received signal on line 612 to preselector/filter 616. Preselector/filter 616 is preferably a very wideband filter having a passband to pass all of the frequencies within a band of interest. Filter 616 generates a filtered signal on line 620 which is supplied to mixer 624. Mixer 624 also receives an oscillating signal on line 628 which, preferably, is generated by a conventional phase locked loop. Mixer 624 generates a down converted signal on line 632 which is supplied to filter 636. Filter 636 generates a filtered signal on line 640 which is supplied to amplifier 644. Amplifier 644 generates an amplified signal on line 648 which is supplied to second mixer 652. Second mixer 652 also receives an oscillating signal on line 656, which, again, is preferably supplied by a conventional, phase locked loop circuit. Second mixer 652 generates an second down conversion signal on line 654 which is supplied to filter 660. Filter 660 generates a filtered signal on line 666 which is supplied to limiter 670. Limiter 670 generates a voltage-limited signal on line 674 which is supplied to demodulation circuit 678. Demodulation circuit 678 demodulates the signal supplied thereto on line 674 and generates an output signal on line 682.

The block diagram of FIG. 13 further illustrates a transmit portion of radiotelephone 604 comprising microphone 686, modulator 692, mixer 696, and filter 700. A filtered signal generated by filter 700 is supplied to antenna 608 on line 704 to permit transmission therefrom.

It is noted that the top portion of the block diagram of FIG. 13 also describes a receiver, such as a radio-pager which may similarly be powered by the capacitive power supply of the present invention.

Turning finally to the cut-away, schematic view of FIG. 14, a portion of the capacitive power supply of the present invention is shown. As mentioned previously, capacitor designs have been developed which are both of high capacitive values and low effective series resistances. FIG. 14 illustrates eight of such capacitors, referred to by reference numerals 750, 754, 758, 762, 766, 770, 774, and 778 housed within supportive housing 782. Each capacitor 750-778 is of substantially similar dimensions and construction, namely, each plate is approximate forty square centimeters (area) in lengthwise and widthwise dimensions, five mils in height, and each plate thereof is comprised of a ceramic conductive material to provide a relatively thin power source with a nominal voltage of 1.2 volts, and low, series resistance. Separating opposing plates of each capacitor 750-778 is an aqueous dielectric, indicated by material 786 contained within the internal chamber formed of supportive housing 782. Material 786 may alternately be comprised of a nonaqueous dielectric or a solid-state electrolyte. Additionally, the surfaces of each plate are rough, uneven, and sponge-like in appearance, and contain pores to form porous surfaces thereby.

While the present invention has been described in connection with the preferred embodiments shown in the various figures, it is to be understood that other similar embodiments may be used and modifications and additions may be made to the described embodiments for performing the same function of the present invention without deviating therefrom. Therefore, the present invention should not be limited to any single embodiment, but rather construed in breadth and scope in accordance with the recitation of the appended claims.

What is claimed is:

1. A portable, rechargeable power supply forming a power source of pre-defined characteristics for powering a load element when coupled thereto, said power supply having:

means forming a first conductive surface comprised of a conductive material for collecting and storing electrical charge responsive to application of a charging current thereto;

means forming a second conductive surface comprised of a conductive material and spaced-apart from the first conductive surface whereby a potential difference is formed between the first conductive surface and the second conductive surface when electrical charge is stored upon the first conductive surface, said first conductive surface and said second conductive surface spaced-apart therefrom together being of a low electrical resistance to minimize, thereby, resistive loss across the first and second conductive surfaces, respectively, during discharge of the electrical charge stored upon the first conductive surface to power the load element when coupled thereto;

a transistor network formed of at least one transistor having a first terminal connected to the first conductive surface and a second terminal connected to the second conductive surface; and means for biasing the transistor to vary conductive characteristics thereof such that the transistor forms a shunt for reducing levels of the charging current applied to the first conductive surface when the potential difference formed between the first conductive surface and the second conductive surface is beyond a pre-determined value.

2. The portable, rechargeable power supply of claim 1 wherein said at least one transistor of the transistor network comprises a bipolar junction transistor.

3. The portable, rechargeable power supply of claim 2 wherein said means for biasing biases a base electrode of the bipolar junction transistor with a current of a level indicative of the potential difference formed between the first conductive surface and the second conductive surface.

4. The portable, rechargeable power supply of claim 3 wherein the transistor forms a shunt when the current supplied to the base electrode of the transistor is beyond a certain level.

5. The portable, rechargeable power supply of claim 3 wherein said means for biasing comprises a resistor having first and second sides wherein the first side of the resistor is connected to the first conductive surface and the second side of the resistor is connected to the base electrode of the transistor.

6. The portable, rechargeable power supply of claim 1 further comprising a plurality of first conductive surfaces and a plurality of second conductive surfaces wherein pairs of surfaces, each formed of a first conductive surface and a corresponding, spaced-apart, second conductive surface are connected in a series connection.

7. The portable, rechargeable power supply of claim 6 further comprising a plurality of transistor networks, each formed of at least one transistor and means for biasing the transistors of each of the transistor networks wherein each pair of surfaces has associated therewith at least one transistor network for forming a shunt circuit for shunting the charging current thereto when potential differences formed between the surfaces forming the pairs of surfaces is beyond the pre-determined value.

8. The portable, rechargeable power supply of claim 7 wherein said pairs of surfaces are stacked vertically upon one another wherein a first conductive surface of a first pair of surfaces is coupled to a second conductive surface of a pair of surfaces positioned thereabove, and wherein a second conductive surface of said first pair of surfaces is coupled to a first conductive surface of a pair of surfaces positioned therebeneath to connect the pairs of surfaces, thereby, in said series connection.

9. The portable, rechargeable power supply of claim 1 wherein said conductive material comprising the first and the second conductive surfaces, respectively, includes a conductive, ceramic material.

10. The portable, rechargeable power supply of claim 1 further comprising an aqueous, dielectric material separating the first and the second conductive surfaces, respectively.

11. The portable, rechargeable power supply of claim 1 further comprising a nonaqueous, dielectric material separating the first and the second conductive surfaces, respectively.

12. The portable, rechargeable power supply of claim 1 further comprising a solid-state, dielectric material separating the first and the second conductive surfaces, respectively.

13. The portable, rechargeable power supply of claim 1 wherein said first conductive surface is of a porous configuration.

14. The portable, rechargeable power supply of claim 1 wherein said second surface is of a porous configuration.

15. The portable, rechargeable power supply of claim 1 wherein said first conductive surface is of elongated lengthwise and widthwise dimensions relative to depthwise dimensions thereof.

16. The portable, rechargeable power supply of claim 1 wherein said second conductive surface is of elongated lengthwise and widthwise dimensions relative to depthwise dimensions thereof.

17. The portable, rechargeable power supply of claim 1 further comprising a supportive housing for supportively housing the first conductive surface, and the second conductive surface spaced-apart therefrom, therewithin.

18. A rechargeable, transceiver power supply for carriage with a transceiver to power the transceiver when suitably coupled thereto, said transceiver power supply comprised of:
   means forming a first conductive surface comprised of a conductive material for collecting and storing electrical charge responsive to application of a charging current thereto;
   means forming a second conductive surface comprised of a conductive material and spaced-apart from the first conductive surface whereby a potential difference is formed between the first conductive surface and the second conductive surface when electrical charge is stored upon the first conductive surface, said first conductive surface and said second conductive surface spaced-apart therefrom together being of a low electrical resistance to minimize, thereby, resistive loss across the first and second conductive surfaces, respectively, during discharge of the electrical charge stored upon the first conductive surface to power the transceiver when coupled thereto; and
   a transistor network formed of at least one transistor having a first terminal connected to the first conductive surface and a second terminal connected to the second conductive surface; and
   means for biasing the transistor to vary conductive characteristics thereof such that the transistor forms a shunt for reducing levels of the charging current applied to the first conductive surface when the potential difference formed between the first conductive surface and the second conductive surface is beyond a pre-determined value.

19. The transceiver power supply of claim 18 further comprising a plurality of first conductive surfaces and a plurality of second conductive surfaces wherein pairs of surfaces, each formed of a first conductive surface and a corresponding, spaced-apart second conductive surface are connected in a series connection.

20. The transceiver power supply of claim 19 further comprising a plurality of transistor networks, each formed of at least one transistor and means for biasing the transistors of each of the transistor networks wherein each pair of surfaces has associated therewith at least one transistor network for forming a shunt circuit for shunting the charging current thereto when potential differences formed between the surfaces forming the pairs of surfaces is beyond the pre-determined value.

21. The transceiver power supply of claim 20 wherein said pairs of surfaces are stacked vertically upon one another wherein a first conductive surface of a first pair of surfaces is coupled to a second conductive surface of a pair of surfaces positioned thereabove, and wherein a second conductive surface of said first pair of surfaces coupled to a first conductive surface of a pair of surfaces positioned therebeneath to connect the pairs of surfaces, thereby, in said series connection.

22. A portable, rechargeable power supply forming a power source of pre-defined characteristics for powering a load element when coupled thereto, said power supply comprising:
   a plurality of conductive-surface pairs, each of said conductive-surface pairs formed of a first conductive surface comprised of a conductive material for collecting and storing electrical charge responsive to application of a charging current thereto, and a second conductive surface comprised of a conductive material and spaced-apart from the first conductive surface whereby a potential difference is formed between the first conductive surface and the second conductive surface when electrical charge is stored upon the first conductive surface, said first conductive surface and said second conductive surface spaced-apart therefrom of each conductive-surface pair together being of a low electrical resistance to minimize, thereby, resistive loss across the first and second conductive surfaces, respectively, of the conductive-surface pairs during discharge of the electrical charge stored upon the first conductive surfaces to power the load element when coupled thereto;
   a plurality of transistor networks associated with each conductive-surface pair of the plurality of conductive surface pairs, each transistor network of the plurality of transistor networks formed of at least one transistor having a first terminal connected to the first conductive surface and a second terminal connected to the second conductive surface, respectively, of a conductive-surface pair associated therewith; and
   means for biasing the transistors of the plurality of transistor networks such that the transistors of the transistor networks form shunts for reducing levels of the charging current applied to the first conductive surface when the potential difference formed between the first and second conductive surfaces, respectively, of the conductive-surface pairs are beyond pre-determined values.

23. The portable, rechargeable power supply of claim 22 wherein the conductive-surface pairs of the plurality of conductive-surface pairs are stacked vertically upon one another wherein a first conductive surface of a first pair of surfaces is coupled to a second conductive surface of a pair of surfaces positioned thereabove, and wherein a second conductive surface of said first pair of surfaces is coupled to a first conductive surface of a pair of surfaces positioned therebeneath to connect the conductive-surface pairs, thereby, in a series connection.

24. The portable, rechargeable power supply of claim 23 wherein the transistors of the plurality of transistor networks are comprised of bipolar junction transistors.

25. The portable, rechargeable power supply of claim 24 wherein said means for biasing biases base electrodes of the bipolar junction transistors with currents of levels indicative of the potential differences formed between the first conductive surfaces and the second conductive surfaces of the plurality of conductive-surface pairs.

26. The portable, rechargeable power supply of claim 24 wherein said means for biasing comprises resistors associated with each transistor network of the plurality of transistor networks, wherein first sides of the resistors are connected to the first conductive surfaces and the second sides of the resistors are connected to the base electrodes of the transistors of the transistor networks associated therewith.

* * * * *